US011669924B2

(12) United States Patent
Varvarenko et al.

(10) Patent No.: US 11,669,924 B2
(45) Date of Patent: Jun. 6, 2023

(54) OPEN FREIGHT MARKET SIMULATION SYSTEM AND OPEN FREIGHT MARKET DISPLAY METHOD

(71) Applicant: Alexander Varvarenko, Odessa (UA)

(72) Inventors: Alexander Varvarenko, Odessa (UA); Natalia Ivanovna Liashenko, Odessa (UA)

(73) Assignee: Alexander Varvarenko, Odessa (UA)

( * ) Notice: Subject to any disclaimer, the term of this patent is extended or adjusted under 35 U.S.C. 154(b) by 442 days.

(21) Appl. No.: 16/329,722

(22) PCT Filed: Jul. 31, 2017

(86) PCT No.: PCT/UA2017/000077
§ 371 (c)(1),
(2) Date: Feb. 28, 2019

(87) PCT Pub. No.: WO2018/194535
PCT Pub. Date: Oct. 25, 2018

(65) Prior Publication Data
US 2019/0197645 A1      Jun. 27, 2019

(30) Foreign Application Priority Data

Apr. 20, 2017   (UA) .............................. a 2017 03894

(51) Int. Cl.
*G06Q 50/28* (2012.01)
*G06Q 10/067* (2023.01)
(Continued)

(52) U.S. Cl.
CPC ........... *G06Q 50/28* (2013.01); *G06F 16/955* (2019.01); *G06Q 10/067* (2013.01); *G06Q 30/0202* (2013.01); *G06Q 50/30* (2013.01)

(58) Field of Classification Search
USPC ........................................................ 705/7.31
See application file for complete search history.

(56) References Cited

U.S. PATENT DOCUMENTS

| 6,463,419 B1* | 10/2002 | Kluss | G06Q 40/04 705/37 |
| 2002/0111892 A1* | 8/2002 | Sharp | G06Q 40/04 705/37 |

(Continued)

FOREIGN PATENT DOCUMENTS

| WO | WO-01/31525 A2 | 5/2001 |
| WO | WO-01/33455 A1 | 5/2001 |

(Continued)

OTHER PUBLICATIONS

Mak et al., Ship Performance Monitoring and Analysis to Improve Fuel Efficiency, 2014, Crown (Year: 2014).*

(Continued)

*Primary Examiner* — Timothy Padot
*Assistant Examiner* — Allison M Neal
(74) *Attorney, Agent, or Firm* — Saliwanchik, Lloyd & Eisenschenk

(57) ABSTRACT

An invention is referred to systems and methods of digital calculations or data processing, specifically designated for special functions, for systems and methods, which allow a consolidated search for information and data base structuring in particular, collection of data and its registration in a digitalized form for the further input into hardware-software system and displaying on devices of users on demand. The system and method use hardware-software system including a hardware module and a data processing module. The hardware module contains central server and a complex of external devices of users, connected with the mentioned central server by data interchange means. The central server is connected with external e-mail servers by e-mail sending/receiving media. The data processing module is being adapted to provide of transforming the received electronic (Continued)

circular letters into a electronic sea shipping contract, containing data on cargo for transportation and data on vessel for transportation, as well as conditions for carriage of freight and port of departure and port of destination date using information, received from the personal accounts of participants of open freight market and complex of personal accounts of transport infrastructure subjects. The central server is connected with at least one database, which contains data of the generated electronic sea shipping contracts, associated with the received applications and/or the personal accounts of users.

24 Claims, 3 Drawing Sheets

(51) Int. Cl.
*G06Q 30/0202* (2023.01)
*G06Q 50/30* (2012.01)
*G06F 16/955* (2019.01)

(56) References Cited

U.S. PATENT DOCUMENTS

| | | | | |
|---|---|---|---|---|
| 2009/0187450 | A1* | 7/2009 | Kocis | G06Q 10/083 |
| | | | | 705/331 |
| 2010/0295679 | A1* | 11/2010 | Smith | G01V 5/0083 |
| | | | | 340/541 |
| 2014/0058775 | A1* | 2/2014 | Siig | G06Q 10/06 |
| | | | | 705/7.12 |
| 2016/0335593 | A1* | 11/2016 | Clarke | G06Q 10/0833 |
| 2017/0310674 | A1* | 10/2017 | Markham | H04L 63/083 |

FOREIGN PATENT DOCUMENTS

| | | |
|---|---|---|
| WO | WO-01/80111 A1 | 10/2001 |
| WO | WO-02/15083 A1 | 2/2002 |
| WO | WO-2014/035891 A1 | 3/2014 |

OTHER PUBLICATIONS

International Search Report dated Oct. 10, 2017 in International Application No. PCT/UA2017/000077.

* cited by examiner

OPEN FREIGHT MARKET SIMULATION SYSTEM AND OPEN FREIGHT MARKET DISPLAY METHOD

CROSS-REFERENCE TO RELATED APPLICATIONS

This application is the U.S. national stage application of International Patent Application No. PCT/UA2017/000077, filed Jul. 31, 2017, which claims the benefit under 35 U.S.C. § 119 of Ukrainian Application No. a201703894, filed Apr. 20, 2017; which are hereby incorporated by reference in their entirety.

FIELD OF AN INVENTION

The invention is referred to systems and methods of digital calculations or data processing, specifically designated for special functions, for systems and methods, which allow a consolidated search for information and data base structuring in particular, collection of data and its registration in a digitalized form for the further input into hardware-software system and displaying on devices of users on demand.

In particular, the invention refers to:

a method of displaying open freight market on the devices of users using at least one hardware-software system, included into the open freight market simulation system. Open freight market shall be understood to mean combination of interdependent processes of receipt and recognition of data related to demand and supply for tonnage/fleet, information sharing about current market condition/conjuncture and its changes, related participants of market via user devices, ensuring information exchange between them during formation of equitable terms of contract/fixture, execution of legitimate documents on the concluded contract/fixture, ensuring monitoring of contract/fixture performance;

a device, namely, to automated information simulation system of open freight market, containing elements of recognition, processing, transfer, storage of data, used to display the open freight market processes, solution-making device and data control units, as well as data acquisition and exchange with other devices, including user devices via the Internet.

The described method and system can also be used for simulation (display) of processes and creation of the corresponding information technological systems related to transmission, recognition, transformation and storage of data on the parameters of regional and global services related to cargo transportation by sea or for implementation into logistics information electronic multisystem in any branch.

TERMS AMD DEFINITIONS

In this description a term "participant of open freight market" shall mean:

cargo owners, including traders, brokers, NVOCC, forwarding agents, contract logistics companies acting as such, as well as their representatives, notwithstanding the legal form of organization and form of ownership;

owner of vessels, including NVOCC, vessel operators, liner operators, vessel managers, authorized banks and other financial institutions, acting as such, as well as their representatives, notwithstanding the legal form of organization and form of ownership.

An owner of vessel as a participant of open freight market in reference to the system and a certain vessel can mean:

an individual or a company, possessing property rights to a certain vessel. Such an owner of vessel can be characterized in the system by means of such data as name and contact information (telephone numbers, e-mail etc.). At the same time, an owner of vessel can have or can have no personal account in the system;

totality of users (operator or broker etc.), having personal account in the system, where through data in a certain vessel was inserted into the data base of the system when submitting application or proposal. By means of the personal account such a user manages data of application or proposal, for example, changes data of the application itself, not related to the operating characteristics of a certain vessel; furthermore, information on proposal or application, respectively, is sent to his personal account in the system.

In this description a term "transport infrastructure subject" shall mean subjects, ensuring the open freight market functioning (port authorities, stevedoring companies, Canal Authority) and their representatives—agents etc., notwithstanding the legal form of organization and form of ownership.

In this description a term "tonnage" shall mean hereinafter a numeric value of this rate, as well as a vessel, place of vessel in case of partial loading and cargo regardless of package.

In this description a term "electronic contract (Recap)" shall mean Fixture Recap, Fixture recapitulation, which is sufficient written form of sea shipping contract and shall at least contain: names of parties, name of vessel, cargo type, freight amount, name of cargo loading point, unloading point or vessel's route, lay days, a reference to the standard form charter party and other conditions at the discretion of parties.

In this description a term "circulation letter" shall mean a data block in a digital form, sent to several addressees, for example, email circulation etc.

In this description a term "software client" shall mean:

software application, installed on user device, for example, mobile application, which can be downloaded from the hardware and software package via the Internet, and/or web-based application, which can be launched, going to the address of the web page via web browser.

DESCRIPTION OF THE PRIOR ART

We know the method and system of conducting freight market operations via the Internet, described in the international application WO 2001080111 A1, G06F 17/60, published on Oct. 25, 2001 (prototype). The described method is used in the operation of the majority of known virtual freight exchanges and includes generation of open data bases of freight market, when obtained them from user device via user interface, related to at least one website of the system, located on the server of information provider and designed with a possibility of users' registration. The method also supposes connection of website of the system with at least one mail server. User devices can be terminals (desktop computers, laptops etc.) of participants of freight market (international sea shipping, international air transportation, international shipment by car etc.), in particular, cargo owners and shipping forwarders, notwithstanding their real geographic location.

When generating the mentioned databases, the received from the user devices data, containing the information about cargo or transport vehicle, the data input in the system is carried out by means of completing a form on the website manually and generating of application data. Moreover, by means of the system and received data of application an auction is conducted to generate equitable terms of contract/fixture related to cargo transportation and to award number of auction with the further display of information about the progress in formation of equitable terms and conditions, namely, freight rate offers for a particular application. The systems provide condition of general, group, or reverse auction and data exchange between the participants of contract/fixture, including by electronic mail via mail server. The method also provides for cargo owner or freight carrier by means of the system and user device selection of the second participant of contract/fixture (freight carrier or cargo owner, respectively) according to the cost of freight parameter and date of closing the mentioned group of auction, as well as data exchange with this participant. At the same time, data on cargos, transport vehicles, participants and process of auction conduction is kept in the corresponding data bases of the system.

On the basis of the described above method and system the majority of popular virtual freight markets is functioning, being realized as opened data bases with access by means of websites with the possibility to register users and their provision with a particular set of functional capabilities. In particular, such similar markets as FreightMarket (refer to the Internet ULR www.freightmarket.com) and OpenSea (refer to the URL opensea.pro), associated with the open freight market functioning, are well-known.

The described above method and system, as well as the claimed method and system, allow displaying and implementing some operations of freight market via the Internet, that can be interpreted as a way of simulation of open freight market with the specified degree of accuracy without being bound to a particular mode of transportation.

The disadvantages of the method and system described above are as follows:

the method and system of the freight market operation execution simulate (display) via the Internet only basic operations data between the generalized quantity of cargo owners and freight carriers of any freight market, not allowing data display of specific management and production processes of open freight market, and data of legal, commercial and financial relationship and interactions between them and/or their representatives, as well as between them and transport infrastructure market participants and/or their representatives, ensuring the sea freight market functioning;

source and method of information (applications) input, containing details of cargo or transportation units (ships/tonnage/vehicles), namely, manually through a form of website by the registered therein users, that reduces the intensity of inflow of applications and their processing, does not allow storage of critical amount of information on tonnage supply and demand of tonnage, conjuncture reflecting real global (regional) freight market and help is estimation/identification of the closest equitable freight rate in bidding for a particular contract/fixture under the conditions of open market. This results in both time increment and increase of the input data processing complexity and generation of data of outgoing letters both for users and for the system operation;

lack of data mining tools in the system in order to avoid doubling or falsification of applications, as well as tools of flexible change of application parameters and cancellation of parent applications with outdated parameters;

method of display, demonstration and storage of the obtained data does not allow its use for automation of justification and decision making (solution) process, in particular, for definition and selection of fleet supply for application for freight transportation in accordance with the various criteria and under various conditions, and vice versa, that results in the processing speed reduction and loss of efficiency of interactions of subjects among themselves and with other participants of open freight market, complication of searching proper variants of applications and proposals or missing suitable variants during the search;

lack of key interrelated information data bases in the system, containing particularly data on freight market participants, data on elements and objects of transport infrastructure (in particular, containing information on restrictions in ports, on canals and rivers, including water draught, minimum allowable length, height and width of vessels, data on handling equipment of port etc.) data on service cost, ensuring transportation process and procedure for calculating its value. The lack of tools, required for adding and updating data does not allow inserting an auxiliary optimization functional module by means of introduction of complex automated system of decision making (solution) support, enabling to obtain system technical effect in the form of the improvement of performance criteria of fleet operation and qualitative indicators of freight traffic;

lack of tools for changing and covering the variety of displayed processes of the freight market, that reduces the usability of the method and its flexibility, when displaying open freight market.

lack of tools for the self-learning system, allowing, in particular, to reduce time and increase efficiency of recognition of incoming data, for example, data of requests or proposals, to improve operational efficiency of the complex automated system of decision making (solution) support etc.

low degree of reliability and lack of up-to-date data of participants and processes of the freight market, as well as data of the transportation infrastructure market condition, ensuring accuracy and reliability of the online freight market data-flows;

slow response of the system users, inhibiting from a timely on-line real-time freight market processes simulation;

slow response of the system users, preventing from a timely on-line real-time freight market processes simulation;

the preparation of legitimate sea shipping contract is not provided (even in the form of a RECAP nor a separate file/Proforma), which could otherwise be available for display on user devices and created on the basis of particular cargo and ship data, as well as agreed terms and conditions.

lack of control or contract execution (contract management tool) by means of monitoring data of vessel status with cargo/without cargo, shipment status and changes to its status.

SUMMARY OF THE INVENTION

The object of the claimed invention is a creation of a method and device (automated information system in the form of hardware-software system) for simulation of open freight market of any level (regional, interregional and global), which ensure:

displaying on the user devices data of specific management and production processes of participants of global (regional) sea freight market, legal, commercial and financial relationship and interactions between them and/or their representatives, as well as between them and transport infrastructure market participants and/or their representatives, ensuring the sea freight market functioning;

independence of the system of the sources and data input methods for their further recognition, processing and display, in particular, any currently known: via e-mail services, from physical media, manually via a form of the website, or interface of mobile application in the adopted or optional form;

increase in speed of data processing and its transformation into the format, required for the subsystems operation, by means of partially automated collective recognition of applications in the parsing system. Besides the increase in intensity of applications inflow and their processing, this allows to increase accumulation rate of critical amount of information on tonnage offering and demand for tonnage, reflecting the real global (regional) freight market conjuncture and promoting the establishment of the closest equitable freight rate in bidding for a particular contract/fixture under the conditions of open market;

labor saving of all users of the system to the data processing of incoming correspondence and generation of data for outgoing correspondence;

avoiding doubling or falsification of requests, as well as tools of flexible change of their parameters with cancellation of initial requests with outdated parameters;

improvement accuracy of data recognition received on cargos, vessels, and terms and conditions with the further data presentation and storage in the interrelated data bases in the format, allowing to transform amount of data in solution-making devices by means mathematical and logical operations. To perform further relevant search of cargos and vessels/ships, satisfying each other to the extent possible by type, characteristics, and also conditions and requirements of cargo owner and vessel owner;

availability, within the system, of correlated global databases, including those on the freight market participants/players, on key elements of transport infrastructure, ensuring the transportation process, on the cost of services and procedure for its calculation etc. Availability of tools for their input and update, which give an possibility to include the system into the complex automated module of the generating a solution, which performs data cleaning, data optimization and calculation, on the basis of restrictions and criteria, set in the system, and allows to obtain system technical effect as improvement of performance criteria of fleet work and qualitative indicators of freight traffic;

improvement of the system self-learning, predominately of such modules as data recognition module, automated module of the generating a solution, and database operations module, that allows to facilitate the open freight market display method and improve its fast response;

generation of actual and complete data base on elements and processes of freight market and market condition of transport infrastructure, that increases accuracy and reliability of the method and system;

improvement of feedback between user devices and the system, allowing to carry out simulation of management and production processes of participants of freight market in the mode, close to "real-time mode";

the opportunity to form an automated legitimate electronic contract (Recap), used in the international freight market, and also a sea shipping contract with regard to a certain cargo on a certain vessel under particular conditions and between particular ports, on the basis of data, obtained from user devices, and from the generated data bases, available at the system output in hard copy in the form of paper record, prepared in accordance with the standard forms adopted in the practice of global merchant shipping;

the opportunity to monitor laden and empty vessel status, contract execution data and it's change using the user devices through the system.

This object is achieved so that according to the invention the claimed open freight market simulation system contains hardware-software system including a hardware module and a data processing module. The hardware module contains at least one central server, a combination of external user devices, connected with the mentioned central server by data the means of interchange and at least one database, which contains data with ship's particulars and the terms and conditions on cargo delivery, associated with the created personal account of participants of open freight market, connected with the central server at least one database, which contains data on peculiarities and/or conditions of request for cargo transportation, associated with the created personal account of participants of open freight market, connected with the central server at least one database, which contains data on peculiarities and/or conditions of the transportation facility functioning, associated with the created personal account of transport infrastructure subjects.

Moreover, the central server is connected with the external e-mail servers by e-mail sending/receiving tools;

The data processing module is designed with an opportunity of functioning by means of website and/or via software client, installed on the external user device, complex of personal accounts of participants of open freight market and complex of personal accounts of transport infrastructure subjects, ensuring the functioning of open freight market.

The data processing module is designed with an opportunity of receiving and storing data of the complex of requests for freight transportation and complex of fleet supply circulars by means of an e-mail service and/or by means of manual input and/or from physical media through the personal account of participant of open freight market in the form of electronic circular letters.

The data processing module contains a module of at least one internal data base, containing data on the set of request for cargo transportation. Program block of the hardware and software package contains a module of at least one internal data base, containing data on the set of applications on the vessels' proposals.

The data processing module is designed with an opportunity of transforming the received electronic circular letters into the electronic sea shipping contract, containing data on cargo for transportation and data on vessel for transportation, as well as conditions for carriage of freight and port of departure and port of destination date using information, received from the personal accounts of participants of open freight market and complex of personal accounts of transport infrastructure subjects. The central server is connected with at least one data base, which contains data of the generated electronic sea shipping contracts, associated with the received applications and/or personal accounts of users.

In accordance with one of the preferred embodiment of the system, the mentioned central server can be stored using cloud storage.

In accordance with another one of preferred embodiment of the system, the central server can be connected with external GEO-systems and with GEO-devices on vessels via means of obtaining the vessel's geographical coordinates and cargo transported thereon.

In accordance with one more of preferred embodiment of the system, the central server can be connected with external servers of payment systems for purpose of the financial transactions performance.

In accordance with another one of the preferred embodiment of the system, the central server can be connected with the external user devices for the purpose of obtaining the software client installation data onto the external user device.

In accordance with another one of the preferred embodiment of the system, the data processing module can contain a module of forming and visualization of data on demand for tonnage and tonnage offering and changes of the specified data.

In accordance with one more of the preferred embodiment of the system, the data processing module can contain a module of data exchange between the participants of open freight market by means of the personal accounts of the participants of open freight market and of data exchange with the transport infrastructure subjects.

In accordance with another one of the preferred embodiment of the system, the data processing module can contain an automated module of the generating a solution connected with at least one database, which contains data of the application for freight transportation, and at least with one data base, containing data of the peculiarities and/or conditions of vessels' proposals as to the freight traffic, associated with the personal account of the transport infrastructure subjects of open freight market;

In this case, the automated module of solution generating a can be connected by means of API system with the client software on the external user devices for automatic search of the submitted irrelevant applications into the system according to the preliminary determined number of criteria by means of dividing the permissible set of these applications, matching the specified criteria, with the further automatic data-binding on the relevant applications/requests with the data on the relevant cargos and/or ships and sending data on the proper cargos and/or vessels/ships onto the external user device using personal accounts of the participants of open freight market and data on the relevant applications onto the external user device using personal accounts of the transport infrastructure subjects.

In accordance with one of the preferred embodiment of the system, the data processing module can contain a module for data-interchange for negotiations on the terms and conditions agreement, including freight estimation and calculation based on at least one pair of the applications/requests or set of the relevant propositions.

In accordance with one more of the preferred embodiment of the system, the data processing module can contain a module of the contract performance monitoring, including visualization of vessel traffic with cargo or without cargo by means of data of the external servers of GEO-systems and data of the GEO-devices of vessels.

In this case, the module of the contract performance monitoring can be implemented in the form of active chart, stimulating vessel traffic and contract/fixture with cargo/vessel, in particular, cargo passage, ballast passage, freight handling, discharge of cargo, vessel demurrage/delay in port/at anchorage in expectation of loading/discharging/servicing, vessel demurrage/delay in port/at anchorage/in the vessel repairing yard because of damage, waiting for maintenance and/or repair.

In accordance with another one of the preferred embodiment of the system, the data processing module can contain data search module in the mentioned above databases according to the criteria, set using the personal account of the participant of open freight market and/or using the personal account of the transport infrastructure subject.

In accordance with one of the preferred embodiment of the system, the data processing module can contain a data recognition module, which recognizes tonnage proposition, including the following data: vessel's name and IMO number, vessel particulars, vessel/ship position, opening date, cargos requirements/restrictions and essential conditions of contract/fixture, and data on demands for tonnage, including the following data: description of cargos, qualitative and quantitative characteristics of cargos, dimensioning specifications, laycan, transport requirements and restrictions, submitted in electronic form via e-mail service and/or via physical media and/or via manual input by means of website and/or via software client.

In accordance with one more of the preferred embodiment of the system, the data recognition module mainly represents an automatic, self-learning e-mail recognition system, installed on the central server, interacting through an operation module with the databases mentioned above and at least one database of parsing rules.

In accordance with one more of the preferred embodiment of the system, the data recognition module can have a structure of add-in modules in a block-chain order according to the scheme as follows: "source data"→"module 1 (processed data)+"source data"→"module 2 (processed data)+"source data"→+"module N (processed data)+"source data-"→"module (N+1) (processed data)+"source data", where every further module contains the processed data from the previous module of chain and data, submitted to the previous module of chain.

In accordance with one of the preferred embodiment of the system, the data processing module can contain located on the server a module for simulation of the equitable freight rate with regard to a pair of the applications or complex of the relevant applications on open freight market under the initially set and changed conditions with the further generation of electronic sea shipping contract.

In accordance with one more of the preferred embodiment, the system can additionally contain an application server, arranged in the cloud storage and interacting via API system with the software client, arranged in cloud storage and on the external user devices.

In accordance with another of the preferred embodiment, the application server is being adapted to provide of the following processes in the virtual space: visualization of real-time tonnage supply and demand on a visual display, showing peculiarities and conditions of vessel propositions and freight requests (cargo propositions) and/or visualization of supply and demand change on the open freight market in real-time and/or visualization of an automated module of decision making (solution) and/or visualization of interaction between the components of the system for displaying the chosen vessel/cargo matches, and vice versa, on the external user device.

In accordance with one more of the preferred embodiment, the data processing module can contain a data transfer module, which transfers data related to the sea shipping contract as a PDF file onto the central server and for storage in the database with an opportunity to send e-mails onto the external user devices, containing data on the changed contract/fixture/vessel status.

In accordance with one of the preferred embodiment of the system, the data processing module can represent a single program block with various access levels.

In accordance with another one of the preferred embodiment of the system, the data processing module can contain a databases of parsing rules module with an independent access level.

In accordance with another one of the preferred embodiment of the system, the data processing module can have an architecture in the form of scalable modules, united in a single point of entry of the system for all external user devices.

In accordance with one of the preferred embodiment of the system, as the external user device one can use cell phone or smartphone, or desktop computer, or laptop, or netbook, or tablet computer, equipped with the central server data exchange means, data processing means and means for displaying data on the screen of an external user device.

This object is achieved so that according to the invention the claimed open freight market display method includes:

a combination of data flow open freight market players as well as a complex of personal accounts and data-flow of elements of the transport infrastructure on the central server of at least one data processing module of a hardware-software system via website and/or software client, associated with the mentioned central server, reception by the central server of data containing freight requests and cargo propositions, as well as propositions of vessels (open positions) in the form of electronic circulars (letters) using e-mail service and/or by means of manual input and/or from physical media through the personal account of the participant of open freight market in the form of electronic circular letters, generation of central server based database, containing data on ship particulars and/or fleet supply/offer conditions for cargo transportation, associated with the creation of personal account of participants of open freight market, generation of data base connected with the central server, which contains data on cargo characteristics and/or terms and conditions of cargo transportation, associated with the created personal account of participants of open freight market, generation of a number of the relevant applications and vessel's characteristics/particulars as well as their open positions and cargo transportation restrictions and requirements for further negotiations via e-mail and data exchange between the personal accounts of the participants of open freight market, with the aid of the program block of the hardware and software package transformation of a number of the relevant applications into the electronic sea shipping contract, containing data on cargo for transportation and ship's particulars, as well as conditions for carriage of freight and port of departure and port of destination date using information, received from the personal accounts of the participants of open freight market and complex of personal accounts of the key players of transport infrastructure.

storage of application data for freight transportation and data of the created electronic sea shipping contract in database, connected with the central server, sending the created electronic sea shipping contract onto the external user device using the personal account of the participant of open freight market and personal account of the transport infrastructure subject.

In accordance with one of the preferred embodiment of the method, the electronic sea shipping contract can be available in paper hard copy, executed in accordance with the standards of documenting freight shipment.

In accordance with one more of the preferred versions of the method, the recognized current data on the parameters of demand for tonnage and tonnage offering can be transferred to the data base of applications for the purpose of creation of single information complex with data in ever-growing and updated global data bases of the system in the format, which allows transformation into the automated module of solution generating to determine a variety of the related applications by displaying the variety of data onto a range of solutions.

In accordance with another one of the preferred embodiment of the method, it is possible to insert data preferably of the financial result of vessel operation using the personal account of the participant of open freight market for further automatic generation of a number of the relevant applications with parameters best fit to the specified result in the automated module of solution generating.

In accordance with the invention, any level (regional, interregional, and global) open freight market simulation is carried out by means of automated information system, which represents hardware-software system, allowing to simulate (display) the operation of a real object, that is open freight market and processes of its functioning via the Internet. Such an opportunity is achieved by using in the hardware-software system the interrelated program modules technical means and storage facility, allowing to perform management and production processes of open freight market via the Internet from the external user device by means of the created in the system personal accounts of the participants of open freight market and by using data of the transport infrastructure subjects, ensuring the open freight market functioning.

Implementation of work of a real object (open freight market) is achieved, first of all, by means of transformation of data from electronic circulars/letters, which come into the system via e-mail services and/or by means of manual input and/or from physical media from the external user devices in the data, allowing their further processing for the purpose of display of data (on user devices) on decision making (solution) and using it to prepare/create legitimate electronic contract (Recap) and a sea shipping contract with regard to a certain cargo on a certain vessel under particular conditions and between particular ports, which is available at the system output in hard copy in the form of paper record, prepared in accordance with the standard forms (in particular, BIMCO, Baltic and International Maritime Council, or other international organizations, determining the standards of documenting freight shipment).

Moreover, a combination of all elements, included into the hardware-software system, namely: the central server, cloud-based or physical, the external user devices, connected with the central server by means of personal accounts, in particular, the external user devices of the participants of open freight market, which can interact with the system central server;

a) connected with the Internet web-site and mobile application by the functions of the registration of system users in the system, data entry, data collection, execution of payments, as well as function of obtaining arranged on the central server modules with customized applications;

b) connected with the external e-mail servers by sending/receiving emails;

c) connected with the external servers of GEO-systems and with GEO-devices of vessels by the functions of obtaining information on geographical coordinates of vessels and cargo thereon;

d) connected with the external servers of payment systems by means of financial contract/fixture functionality, and hardware system (application) installed on the central server, which includes interrelated and interactive system of global data bases and program modules (systems), updating and ever-growing through single program module, more specifically, the module of forming and visualization of data on demand for tonnage and tonnage offering and change of the specified data, the data exchange module between the participants of open freight market, the automated module of the solution generating, the module of data exchange for agreement of terms and conditions, the module of the contract performance monitoring, the data search module, the data recognition module, the module of simulation of the equitable freight rate establishment process, the data transfer module of sea shipping contract into PDF format, the module of forming data bases of parsing rules with independent access level, the application server, required and sufficient for simulation (display) of all essential processes of real open freight market with high degree of accuracy of transferring its particular characteristics of functioning. The ordered set of the mentioned elements allows cutting time to process a chain of e-mails, ship's waiting time and duration of cargo storage, labor costs of freight-market, as well as obtaining a certain result in the form of concluded contract of affreightment (recap/Charter party), transformable into standard forms of sea shipping (cargo) contracts in to the form, adopted by the international organizations, which is available in hard (paper) copy.

The set of the mentioned modules also provides for simulation (display) of all processes of open freight market, precisely, formation and visualization of demand for tonnage and tonnage offering, their change, interaction between the participants of freight market and communication with the transport infrastructure subjects, automation of generating a solution, formation of data of the equitable terms of contract/fixture, including establishment of freight rate equitable for cargo owners (their representatives) and vessel owners (their representatives), corresponding emails and documents exchange, formation of legitimate Recap contract with an opportunity to transform it into the standard forms of contracts with retention of all conditions in PDF format and presentation in hard copy, prepared according to the standard forms of BIMCO and other international organizations, determining standards of documenting freight shipment, monitoring contract/fixture completion, including visualization of vessel traffic with cargo and without it.

The data processing module in the form of module structure, united into a single program block with various access levels and having architecture in the form of scalable micro services, united into a single point of entry for external user devices. At the same time this method allows to implement the system interaction with user devices of all behavior type (internal and external with regard to presence or absence of their applications in the system, active and passive—according to the second part search initiation or expectation of proposals of other users) after creation of personal account in the system by means of website or via the software client.

The data recognition module (e-mail parsing engine) allows recognizing information on tonnage positions (name and identification codes of vessels, vessel operating characteristics, position of vessels, date of release of a vessel, requirements to cargos and essential conditions of contract/fixture), and data on demands for tonnage (description of cargos, qualitative and quantitative characteristics of cargos, dimensioning specifications, laycan, conditions of transport, significant conditions of contract/fixture), submitting in electronic form prepared in any form and by any means (via e-mail service, physical media, manual input).

According to the invention, the data recognition module represents the installed on the central server system of collective partially automatically teachable recognition of circular letters, submitting onto the central server from the e-mail systems of external servers and sources of any kind. The mentioned module interacts by means of data base operations module (All Tables&Entities CRUD Operations Module).

The mentioned databases contain relative data on participants of freight market, economical, operational, financial and legal parameters of its functioning, subjects and objects of transport infrastructure, parsing rules data base, bases of cargo owners' and vessel owners' applications. By means of data recognition module and database operations module one carries out data auto update and add up, that results in time interval cutting between receiving and processing a chain of applications data (emails, data, submitted by means of completing a form by means of website or software client etc.) obtained from a number of the external user devices, the results in intensification of processing a vast number of emails from many senders, labor saving of all users of the system spent to the processing incoming and formation of outgoing letters.

Cutting time to receiving and processing a chain of emails apparently in comparison with the approach, when every data block (email, completed form etc.) among the variety of incoming data is local incoming information flow, duly processed and recognized/analyzed.

It is preferable to execute the data recognition module in the context of engineering solution in the form of structure of add-in modules in chain order with open-loop configuration: "source data"→"module 1 (processed data)+"source data"→"module 2 (processed data)+"source data"→ . . . →"module N (processed data)+"source data"→"module (N+1) (processed data)+"source data", where every further module contains processed data from the previous module of the chain and data, submitted to the input of the previous module of the chain.

Such a module structure supposes unification at the entry of all circular letters in single information flow, which is processed by parsing system simultaneously (collective recognition). Therefore, instead of receiving and processing dozens of flows, the system aggregates them into one flow, when they come, that results in time cutting spent to the operations during the processing.

Open-loop configuration allows creating continuous flows of identifiable circulars/letters, submitted into the system in any form, by means of accumulation in the relevant base new parsing rules, which thereafter will speed up the recognition of similar text structures. Therefore, they implement the system of collective partially automatically teachable recognition of electronic circular letters, precisely, teaching the system by means of the parsing rules formation data base module with independent access levels and automated system self-teaching.

At the same time, by means of the parsing rules formation data base module one sets the complex of "primary" system rules, grouped in a model, that allows the system teaching for the further automated recognition of the received data and their further processing. An example of teaching: some rules meet one word or sequences of symbols, on the basis of algorithm of simple Bayesian classifier one chooses the most relevant rule or group of rules.

Accumulation of parsing rule set by means of the mentioned module allows continuing automatic system training. For example, on the basis of the obtained data of a new, previously unknown kind, new (expanded) parsing rules are formed and inserted via the parsing rule data base module into the initial rule base of the system. When receiving data like this again the tonnage offering data recognition module will use expanded parsing rules.

For example, to recognize a range of optional versions of data on tonnage presentation (as one wishes or prefers in writing email without system requirements to its form) one uses a certain rule/set of rules, completing by new. Rule parts refer to the previously created system vocabularies, which are a sort of a system data-base that describes its essentials. Furthermore, rules contain macrostructures (assembled structures). Parsing rule base can contain ever-greater big data units, namely, multi-rules.

The work of database operations module (All Tables&Entities CRUD Operations Module) based on the transfer of up-to date data consisting of parameters of demand and supply of tonnage/ships to the data bases of vessel and cargo owners requests/application, which create a single information complex with data in ever-growing and updating general data bases of the system. Data format allows transforming them in the automated module of generating a solution to determine a variety of the relevant applications by displaying space of input data on the solution space. The data transformation in the required format is carried out in the demand for tonnage data recognition module.

Therefore, the database operations module gets the obtained data structured in the system databases, defines relations of individual data files inside the database, characterizing various parameters of one and the same nature (freight market participant, subjects and objects of transport infrastructure, fleet, cargo base etc.), as well as makes it possible to manage data bases (add and change data etc.).

For example, data can be presented by the database operations module with data bases in the form of JSON (javascript object notation) object-hierarchical relation, that allows using them in the automated module of decision making (solution) and transforming in tabular style, if necessary. The advantage of such a format, is that the heuristic algorithms and optimization economic and mathematical models of the automated module of decision making (solution) can be built not only on the basis of one of the criteria or restriction, but on their variety. This allows building up and enhancing the system with algorithms and models, representing real processes of freight market, including newly developed, that ensures formation of data with recommendations as to the scheming sailing, choosing the second part of contract/fixture, searching related cargos, obtaining desirable financial result, facilitating information processing and support in solving many other problems, and sending them to the user device. At the same time, it is possible to modify and extend the mentioned algorithms and models.

Incoming signal space is sets of quantifiable source data, coming into the automated module of the generating a solution in the form of JSON object-hierarchic relation. Such source data allows implementing the operation of the automated module of the generating a solution by means of computational algorithms included therein. Source data comes from databases, being formed as a result of incoming circular letters processing, for example, these can be data with the current information about market condition, as well as data from the global databases (semi-constant information, keeping in the system data store, containing peculiarities of fleet, cargo base, ports and other objects and subjects of transport infrastructure and so on).

Therefore, the automated module of the of solution generating at the entry, gives a variety of incoming signals, which at the end is transformed into a variety of solutions.

Variety of solutions is made up of a variety of recommendations (solutions), determined on basis of a certain criteria and considering external parameters (the market) as well as internal restrictions (possibilities and requirements of cargo owners, vessel owners and participants of freight market) in choosing the second part of contract/fixture by the participants of market in various time periods of planning and open freight market conditions.

In other words, one of the aspects of open freight market simulation is strictly ordered relationship of the processes implemented in the hardware and software package of the system, more specifically, data occurrence in the system—parsing—data retention in data bases—transformation of data in the automated module of generating a solution—data with recommendations reception—data exchange between user devices concerning the terms of contract/fixture—Recap contract preparation.

Application server ((Main App Logic), arranged in the cloud or another kind, interacts via the APT system with software client, arranged in the cloud and external user devices. Application server can technically be implemented as a server system in the form of thin client or in a different manner. According to the invention, application server allows the system simulating the processes as follows:

visualization of data on demand for tonnage and tonnage offering in real-time mode on any external user device, containing information output unit (monitors and electronic device displays, electronic displays, digital dashboard etc.), in particular, in tabular form, which can have various design and display all significant parameters and conditions of vessels' proposals and request for cargo transportation;

functioning of mechanism of supply and demand change in the freight market in real-time mode, which defines an opportunity of changing significant characteristics and conditions of vessels' proposals and request for cargo transportation with the relevant display in the system;

functioning of automated module of generating a solution and decision making;

functioning of the mechanism of interaction between the main elements of the system.

In other words, application server in terms of program component represents a system core and performs interaction of the system modules among themselves.

Automated solution generating module (Filter&Solver) is installed in the application server and connected with software client on the external user devices by means of API, and allows to obtain system technical result by way of cutting time spent for searching irrelevant requests in the system by means of accelerated search of data on vessel and cargo matches according to the pre-determined criteria using iteration division of admissible set of proper applications and reduction of their number in accordance with the parameters of applicants, initiating search.

At the same time, to form data on solution generating popular algorithms of solution generating can be used, including a set of calculation procedures, methods of filtration and economic and mathematical models, implemented programmatically, for example:

1) GRG Nonlinear Solving method (generalized reduced gradient);

2) Linear Programs solution search by the Simplex Method;

3) Transportation Type Problems solution by the Method of Potentials;

4) Evolutional Solver

This set is not exhaustive and can be amended during the operational phase of the system.

It is possible to use the system without the automated module of generating a solution, wherein users are provided with the access to the data bases and their visualization, for example, visualization of data on demand for tonnage and demand offering on the external user device. At the same time, solution on selection of the counterpart for deal-making/contract/fixture is made by the user, which can make solution more practical, but far from optimal. Moreover, increase of source data amount will make the decision making (solution) process almost impossible without the automated module of the solution generating process. The solution, obtained by means of the automated module of solution making process will be close to the optimal one or optimal depending on the used mathematical apparatus.

The module of equitable freight rate estimation process simulation (Bidding Module) is installed on the central server and allows simulating (displaying) the equitable freight rate estimation/generating process in the open freight market under the previously set terms taking into account data of the received request or data on changes in the request from user device, ensuring the data exchange between the registered in the system users, that is contract/fixture parties.

This module forms electronic contract (Recap), which contains data on essential conditions of trip charter, defined during the system operation, including data on description of vessel and trip, freight rate and demurrage, lay days, as well as the arbitration clause data (together with an indication of applicable law. Such a contract is considered to be legitimate, since in accordance with the rules of English law, obtaining the agreed destination to trip via email or by fax shall be deemed synonymous to conclusion of trip charter (actual signing the proforma charter party in hard copy (on paper)). Furthermore, this module allows to obtain concluded agreement at the output of the system upon the user's request therefor, for example, in hard copy in the form of paper record, formed in accordance with BIMCO standard forms and other international organizations, determining standards of documenting freight shipment.

The Fixture/Contract execution-monitoring module (Vessel Status Module) is designed for monitoring the confirmed contract/fixtures and implementing visualization of position and status of tangible object (vessel) on the display of the external user device. Visualization can be implemented in the form of active chart, stimulating vessel traffic and also operations with cargo/vessel: cargo passage, ballast passage, freight handling, discharge of cargo, vessel demurrage in port/at anchorage in expectation of loading/discharging/servicing, vessel demurrage in port/at anchorage/in the vessel repairing yard because of damage, waiting for maintenance, repair of vessel.

Data exchange module between the participants of open freight market (Order storing & Notification Module) is designed for storing contract/fixture data as a PDF file in the relevant data base, connected with the central server, as well as for forming and sending notices in a digital form (emails etc.) to users about any changes in contract/fixture/vessel status, for example, by means of external e-mail servers.

BRIEF DESCRIPTION OF THE DRAWINGS

The invention is exemplified by the implementation of the open freight market simulation system and open freight market display method, as well as diagrams with following data.

The examples below of the open freight market simulation system and open freight market display method, as well as the diagrams, used in the description, do not reduce the number of the other options of embodiment of the invention, but they are designed for explanation of its essence.

DETAILED DESCRIPTION OF PREFERRED EMBODIMENTS

Figure 1:
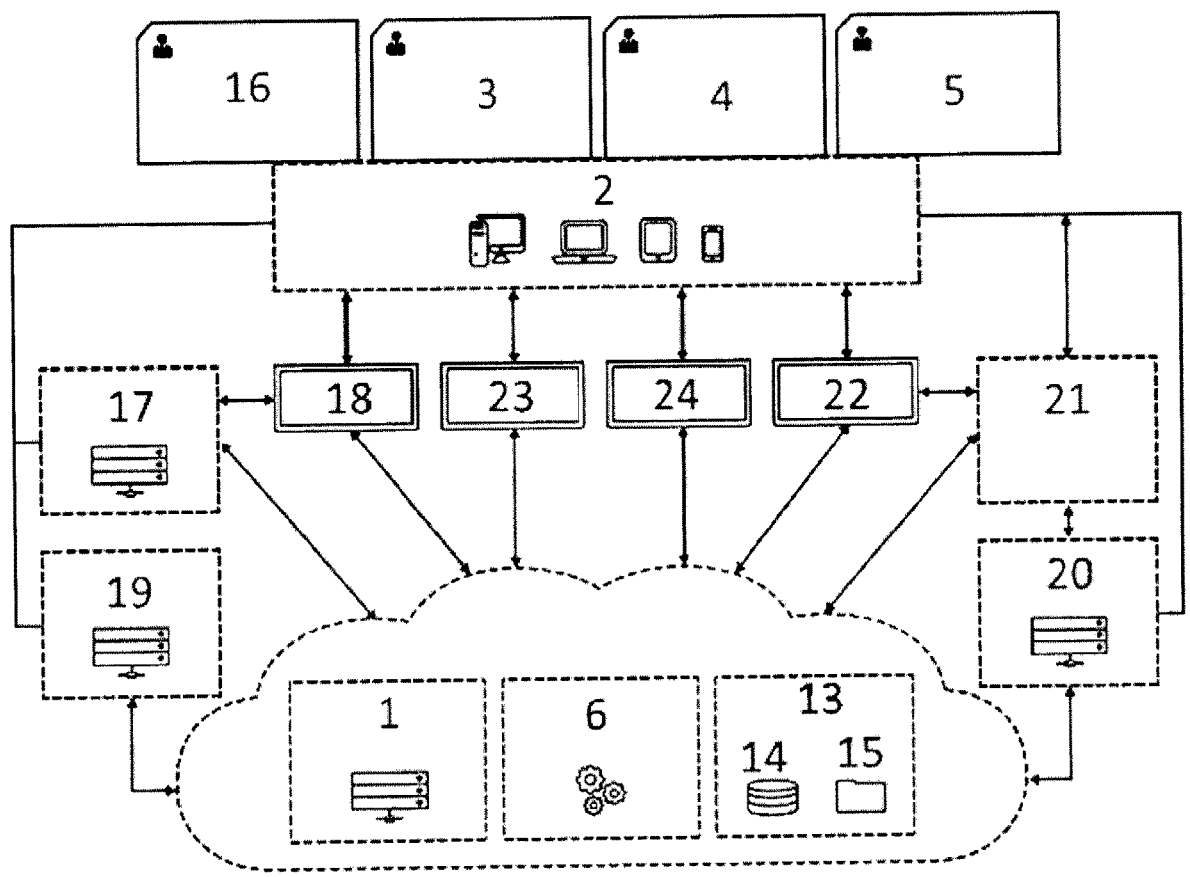
in FIG. 1 is shown the device flow diagram of the open freight market automated simulation system, in FIG. 2 is shown the display mode flow diagram of open freight market by means of the open freight market simulation system, in FIG. 3 is shown the system operation flow diagram depending on the chosen mode of interaction between user and system and user's relation to cargo owners, vessel owners or brokers.

Open freight market simulation system contains a hardware module and a data processing module (FIG. 1). The ardware module contains a central server 1 and complex of external user devices 2, connected with the mentioned central server 1 by data interchange means.

The central server 1 can be arranged in cloud storage or of any other kind with the secure operating system.

As the external user device 2 one can use cell phone or smartphone, or desktop computer, or laptop, or netbook, or tablet computer, equipped with the central server 1 data exchange facility, data processing facilities and means for displaying data on the screen of an external user device.

The totality of the external user devices 2 contains external devices, connected with the participants of open freight market, more specifically, at least one external device of cargo owner 3 and at least one external device of vessel owner 4, and also complex of external devices 5 of the transport infrastructure subjects.

On the central server 1 there is a the data processing module 6, which contains a set of the program modules (FIG. 2) more specifically, the database operations module 7 (All Tables&Entities CRUD Operations Module), the data recognition module 8 (E-mail parsing Engine), the application server 9 (Main App Logic), equipped with the automated module of solutions generating (Filter&Solver), the module of simulation of the equitable freight rate establishment process 10 (Bidding Module), the module of the transaction the contract performance monitoring 11 (Vessel Status Module), the module of data exchange between the participants of open freight market by means of personal accounts of the participants of open freight market and system data exchange with the transport infrastructure subjects 12 (Order storing&Notification Module).

The system also contains a storage 13 (connected with the central server 1), which contains the complex of databases 14 and a file system 15 for organization of data storage in the mentioned database. The complex of data bases 14 contains at least:

data on vessel's characteristics and/or conditions of vessels' proposals as to the freight transportation, associated with the created personal account of participants of open freight market;

data on cargo description and/or conditions of request for cargo transportation, associated with the created personal account of the participants of open freight market;

data on characteristics and/or conditions and restrictions of the transport infrastructure and facility, associated with the created personal account of the transport infrastructure subjects;

data of the generated electronic sea shipping contracts, associated with the received applications and/or personal accounts of users;

parsing rules data.

The complex of databases 14 also can contain the relevant information on the participants of freight market, economical, operating, financial and legal aspects of its functioning, objects and subjects of transport infrastructure, in particular, peculiarities of ports (terminals of stevedoring companies) and shipping canals, an opportunity to admit vessels with special operating characteristics and to stow/unload certain cargos in the definite amount in the required time etc.

The data processing module 6 of the central server 1 and the storage 13 can be arranged in cloud storage (FIG. 1) or implemented in a different way.

The system also contains the module of forming data bases of parsing rules with an independent access level with at least one automated worksite 16, designed for data recording, processing and transferring.

The system also contains:

at least one external e-mail server 17, connected with the central server 1 by means of e-mail sending/receiving tools, for example, e-mail service 18, at least one external server of payment system 19, connected with the central server 1 to complete financial contract/fixture, at least one interconnected GEO-system server 20 and the complex of GEO devices of vessels 21, connected with the central server 1 by means for obtaining the vessel's geographical coordinates and cargo transported thereon. The complex of GEO-devices of vessels 21 also can be connected with the central server 1 via the application for geological steering 22, installed on the external user device.

The central server 1 is also connected with the website 23 and/or with mobile application 24, installed on the external user device 2, by means of the functions of creating personal account of user, data input into the system, obtaining data from the system, making payments, as well as function of getting modules (arranged on the central server 1) with a mobile application 24 and its updating.

The data processing module 6 contains means via website 23 and/or via mobile application 24, installed on the external user device 2, to form the complex of personal accounts of participants of open freight market, in particular, cargo owners and vessel owners, and also the complex of personal accounts of transport infrastructure subjects, ensuring the functioning of open freight market.

The data processing module 6 also contains means for receiving and storing data of the complex of request for cargo transportation and complex of the applications on the proposals of vessels in form of electronic circulars/letters, using e-mail service and/or by means of manual input and/or from physical media through the personal account of participant of open freight market in the form of electronic circular letters.

The central server 1 can be connected with the external user devices 2 for the purpose of obtaining the installation data of mobile application 24 or its updating onto the external user device 2 via the application server 9.

The database operations module 7 is suitable for interaction between the data recognition module 8 and the complex of databases 14. At the same time, the recognized current data on the parameters of demand for tonnage and tonnage offerings is transferred to the databases of applications of vessel owners and cargo owners, which create a single information complex with data in ever-growing and updating global data bases of the system.

The data recognition module 8 represents an installed on the central server 1 system of collective partially automatically teachable recognition of electronic circular letters, interacting through a module of operations with the complex of data bases 14, including data base of parsing rules. Such a system can be implemented in the form of the structure of add-in modules in chain order according to the scheme as follows: "source data"→module 1 (processed data)+"source data"→"module 2 (processed data)+"source data"→ . . . →"module N (processed data)+"source data"→"module (N+1) (processed data)+"source data", where every further module contains processed data from the previous module of chain and data, submitted to the input of the previous module of chain.

The data recognition module 8 is designed for, in particular, recognition of tonnage proposals, including data as follows: name and IMO Number of vessels, vessel characteristics and operating data, position of vessels, place and date of opening of a vessel, requirements to cargos and essential conditions of contract/fixture, and data on demands for tonnage, including the following data: description of cargos, qualitative and quantitative characteristics of cargos, dimensioning specifications, laycan, conditions of transport, significant conditions of contract/fixture, submitting in electronic form prepared in any form via e-mail service and/or via physical media and/or via manual input by means of website and/or via software client.

The application server 9 is arranged in the cloud storage and interacts via API system with software client, arranged in cloud storage and on the external user devices. The application server 9 is designed for simulation of the following processes in the virtual space: visualization of demand for tonnage and tonnage offering in real-time mode on the information output data displaying peculiarities and conditions of vessels' proposals and request for cargo transportation and/or visualization of supply and demand change in the open freight market in real-time mode and/or visualization of automated module function of generating a solution and/or visualization of interaction between the components of the system for displaying on the external user device the chosen vessel/cargo matches, and vice versa.

The automated module of the generating a solution is designed as a subsystem of the application server 9 connected with at least one database in the complex of databases 14, which contains data of application for freight transportation, and at least with one data base, containing data of the peculiarities and/or conditions of vessels' proposals as to the freight traffic, associated with the created personal account of the transport infrastructure subjects of open freight market.

The mentioned automated module for generating a solution is connected by means of API system with the mobile application 24 on the external user devices 2 for automatic finding of submitted irrelevant applications in the system according to the preliminary determined system of criteria by means of dividing the permissible set of these applications, meeting the specified criteria, with the further automatic binding of data on the proper applications with the data on the proper cargos and/or vessels and sending of data on the proper cargos and/or vessels onto the external user device 2 using personal account of participants of open freight market 3 or 4 and data on relevant applications onto the external user device 2 using personal account of transport infrastructure subjects 5.

The data processing module 6 contains data search module in the complex of databases 14 according to the criteria, set using the personal account of participant of open freight market and/or using the personal account of a member in the transport sector.

The module of simulation of the equitable freight rate establishment process 10 is arranged on the server and designed for forming data of equitable freight rate with regard to pair of applications or complex of the relevant applications in the open freight market under the initially set and changed conditions with the further generation of electronic sea shipping contract.

The module of the transaction the contract performance monitoring 11 is suitable for the visualization vessel traffic with cargo and without it by means of external servers of GEO-systems 20 and data if GEO-devices of vessels 21, for example, and it can be implemented in the form of active chart, stimulating vessel traffic and contract/fixture with cargo/vessel, in particular, cargo passage, ballast passage, freight handling, discharge of cargo, vessel demurrage in port/at anchorage in expectation of loading/discharging/servicing, vessel demurrage in port/at anchorage/in the vessel repairing yard because of damage, waiting for maintenance, repair of vessel.

The data exchange module 12 is designed for agreement of terms and conditions, including establishment of equitable freight rate for the participants of open freight market with regard to at least one pair of applications or set of the relevant applications.

The data exchange module 12 also contains a data transfer module, which transfers data related to the sea shipping contract as a PDF file onto the central server 1 and for the storage in the complex of data bases 14 with an opportunity to send e-mails onto the external user devices, containing data on the changed contract/fixture/vessel status.

The data processing module, in general, represents a single program block with various access levels of users. The program block has an architecture in the form of scalable modules, united in a single point of the system input for all external user devices.

The various access levels of users are implemented by means of the application server, which can be equipped with the registration and authorization subsystem on the basis of JWT tokens (JSON WEB TOKEN), responsible for user authorization. The mentioned subsystem has flexible implementation in the form of many libraries in several programming languages and high security level, as well as very high support level.

In the same way, the system and the method suppose the data protection improvement, in particular, user confidential information and/or data on their interacting processes. For this purpose, for example, one can use communication channel encryption procedure (client-server) using HTTPS protocol with TLS (hybrid cryptographic system), consisting of several cryptographic approaches, in particular:

1) asymmetric encryption (cryptosystem with public key) for the generation of general private key and authentication, used thereafter when connecting external user device with the central server.

2) symmetric encryption, using a private key for the further questions and answers encryption.

JWT system of tokens generation can also be used for protection, used when providing access levels.

Contract/fixture data protection between users can be ensured at the program module logic level and implemented by means of the application server.

Data output onto the external user device, as well as the data exchange between an external user device and central server can be carried out via REST requests (Representational State Transfer—"state presentation transfer").

Open freight market display method using the system described above can be implemented in the following manner.

First, forms a complex of personal accounts of participants of open freight market and complex of personal accounts of transport infrastructure subjects on the central server 1 at least one data processing module 6 by means of website 23 and/or mobile application 24 associated with the mentioned central server 1.

The complex of personal accounts includes (FIG. 2):

personal accounts of users 25 (cargo owners) and similar to them according to the status, personal accounts of users 26 (vessel owners) and similar to them according to the status, personal accounts of users 27 (transport infrastructure subjects and their representatives), personal account of users 28, having an individual access level and associated with parsing rules data bases module. Users 28 register in the system by creating personal account of a certain kind in accordance with the established procedure, have advanced rights of access and can perform internal control functions in the system in the open freight market simulation system.

Then the central server 1 receives the complex of data of request for cargo transportation and complex of the applications on the proposals of vessels (offering tonnage) in form of electronic circular letters using e-mail services and/or by means of manual input and/or from physical media through the mentioned personal accounts.

Upon data occurrence one forms a complex of data bases connected with the central server 1 in the general complex of databases 14, which at least contains the data as follows:

data on particularities and/or conditions of vessels' proposals as to the freight transportation, associated with the created personal account of participants of freight market, data on peculiarities and/or conditions of the freight transportation by vessels, associated with the created personal account of participants of open freight market, data of a number of the relevant applications and data on the peculiarities and/or conditions of the vessels' proposals as to the cargo traffic.

Figure 3:
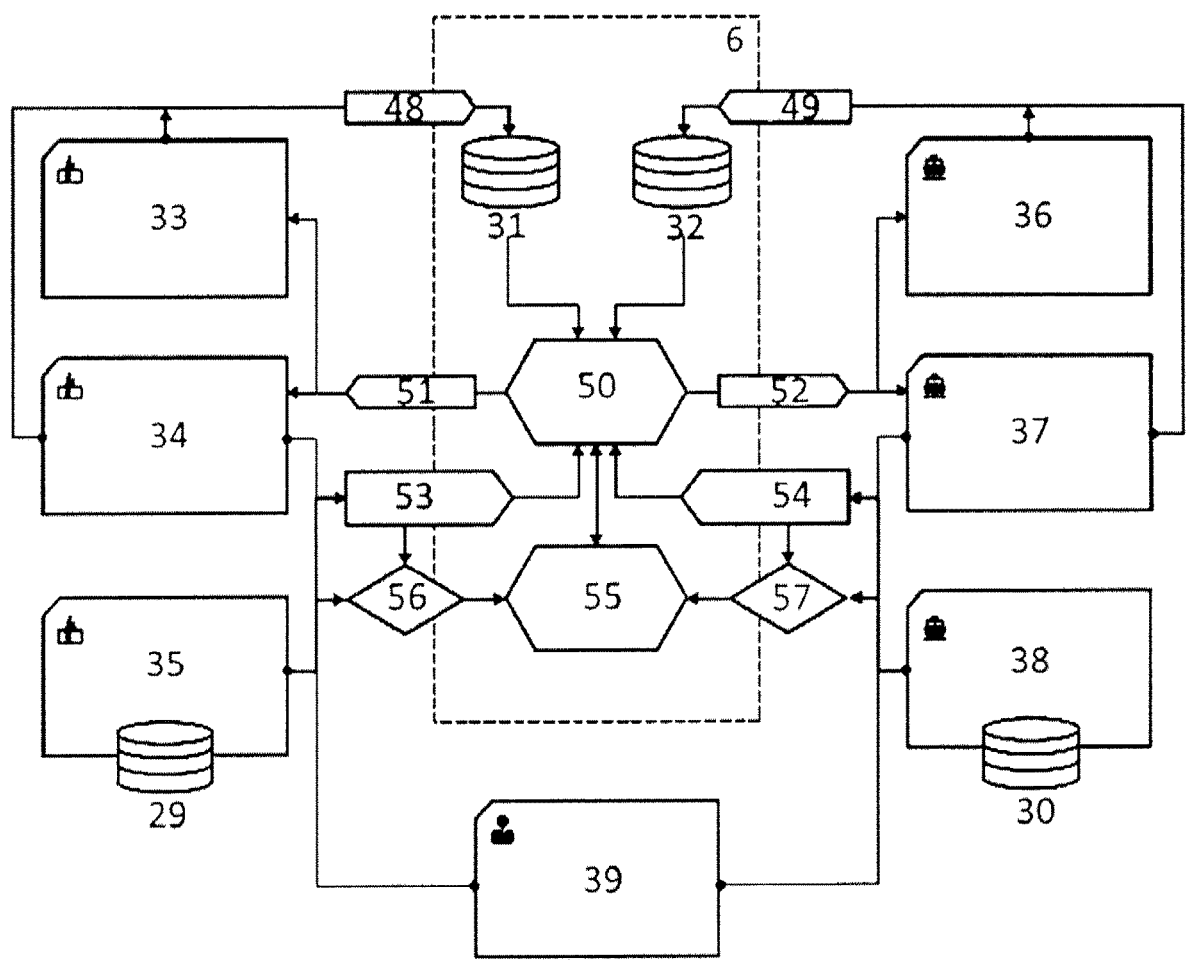

Formation of a complex of data bases connected with the central server 1 in the general complex of data bases 14 can be carried out by means of the following data bases (FIG. 3):

cargo owner's cargo local database 29, vessel owner vessel local database 30, cargo owner's application database 31, vessel owner's application database 32.

At the same time, local data bases 29 and 30 are not the elements of the system (FIG. 3) and can be preliminary formed by the corresponding participant of open freight market at a certain data carrier, including in cloud, in the form, suitable for the system.

The system processes obtained data depending on the chosen by the user mode of interaction between user and system and user's relation to cargo owners, vessel owners or brokers. Optional versions of interaction between user and system of the open freight market simulation in various modes are shown in the FIG. 3:

User 33 (passive behavior cargo owner). Sending the data of application for freight traffic to the central server 1 via the external user device, for example, by means of e-mail service 18, completing a form at the website 23 or via mobile application 24 and obtaining data of vessel owners' proposals onto the external user device;

User 34 (mixed behavior cargo owner), sending the data of application for freight transportation to the central server 1 via the e-mail service 18, completing a form at the website 23 or via mobile application 24 and obtaining data of vessel owners' proposals, as well as simultaneously searching data of the proper proposals of vessels not using/using the automated module of generating a solution;

User 35 (active behavior cargo owner), searching data on vessels for cargo traffic among the vessel owners' proposals in the system using/not using the automated module of generating a solution. Meanwhile, data of application for freight traffic is not sent to the central server 1;

User 36 (passive behavior vessel owner), sending the data of vessel proposal to the central server 1 via the e-mail service 18, completing a form at the website 23 or via mobile application 24 and obtaining data of cargo owners' request for cargo traffic;

User 37 (mixed behavior vessel owner), sending the data of vessel proposal to the central server 1 via the e-mail service 18, completing a form at the website 23 or via mobile application 24 and obtaining data on cargo owners' request for cargo transportation, as well as simultaneous data search of the request for cargo transportation from cargo owners not using/using the automated module of solution generation;

User 38 (active behavior vessel owner), searching data on cargos for own vessels from request for cargo traffic in the system using/not using the automated module of generating a solution. Meanwhile, data of vessel proposal is not sent to the central server 1;

User 39 (active behavior broker), searching data of request for cargo traffic and vessel, meeting the search criteria, not using/using the automated module of generating a solution, in other words, using the system as information resource with an opportunity for forming/generating a solution.

Figure 2:
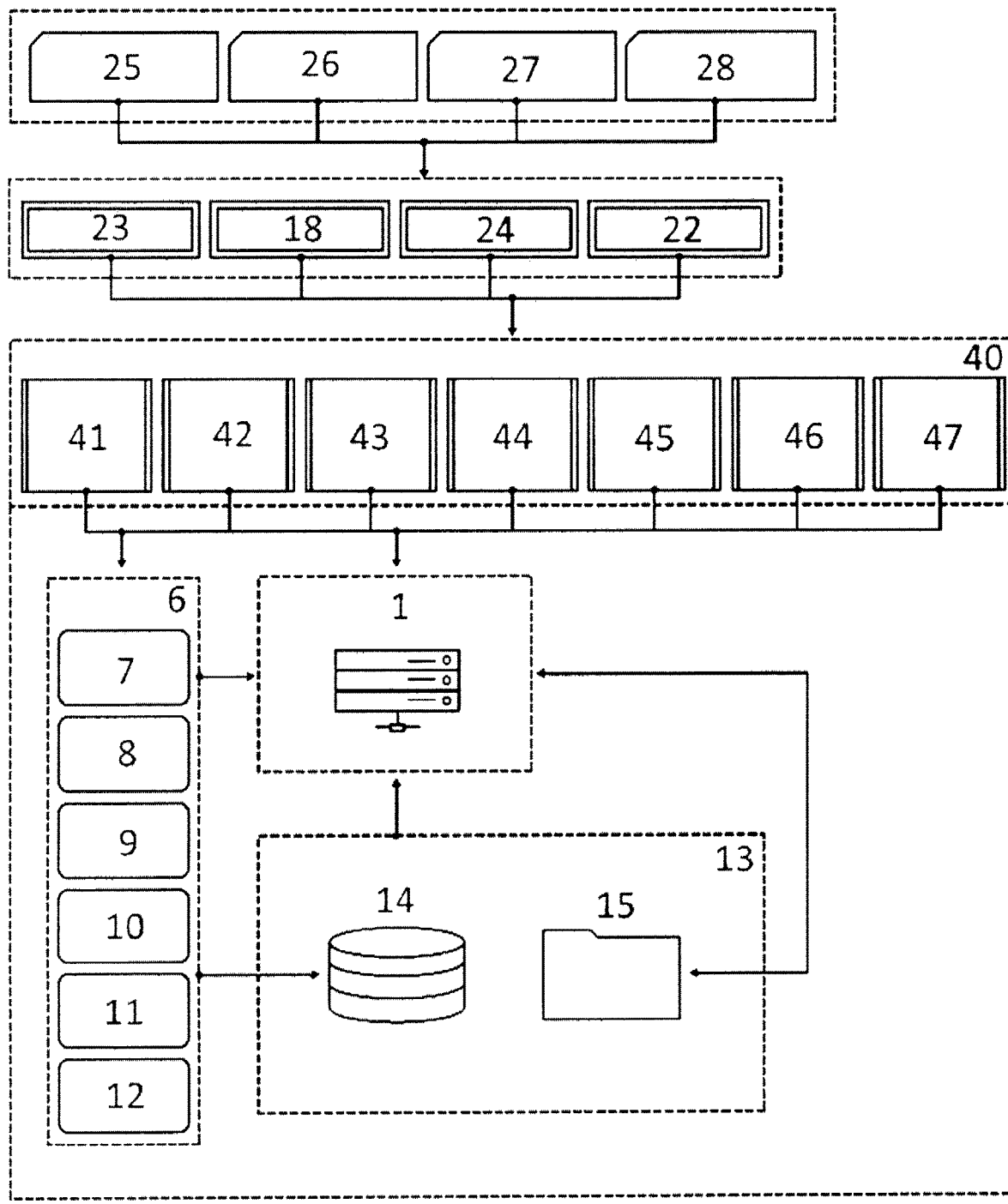

Using the data processing module 6, which contains a set of the mentioned program modules, one performs simulation (display) of all open freight market processes. The FIG. 2 shows the block 40, containing a list of such processes as: formation and visualization of data on demand for tonnage and tonnage proposals 41 and 42, editing data of bids and offers 43, automation of solution generating process 44, data exchange between the participants of freight market and transport infrastructure subjects 45, determination of data of the equitable terms of contract/fixture, including estimation of freight rate equitable for cargo owners (their representatives) and vessel owners (their representatives), corresponding emails and documents exchange 46, preparation of legitimate contract (Recap) in electronic form with an opportunity to transform it into the standard forms of contracts (for example, as a PDF using the data exchange module 12), admitted by the international organizations (BIMCO, FONASBA etc.) and its output onto tangible medium (hard copy), monitoring contract/fixture completion data, including visualization of vessel traffic with cargo and without it 47 on the external user device by means of the module of the transaction the contract performance monitoring 11.

The created electronic sea shipping contract (Bimco standard charter party) is available in material form as a paper hard copy, executed in accordance with the standards of documenting freight shipment.

The accumulated and authenticated current data on the parameters of demand for tonnage and tonnage proposals is transferred to the databases 31 and 32 for the purpose of creation of a single information complex with data in ever-growing and updating global data bases of the system in the format, allowing to transform them in the automated module of generating a solution to determine a variety of the relevant applications, displaying space of source data on the solution space by displaying space of input data on the solution space.

Additionally, it is possible to insert data preferably of the financial result of vessel operation using the personal account of the participant of open freight market for the further automatic generation of a number of the relevant applications with the parameters best fit to the specified result in the automated module of generating a solution. The preferable financial result in this case is one of the working conditions of the automated module of generating a solution and generation of a number of the relevant applications is also carried out in this module.

The registered users in accordance with the access level and in dependence of the chosen option of interaction with the system exchange data with the system and by means of the system with other users, implementing the following interrelated processes (FIG. 3):

1. Data of applications submission and processing (request for cargo transportation 48 and vessels' proposals 49) by the central processing unit 1 (formation and visualization of demand for tonnage and tonnage offering, change of parameters, falsification prevention and applications doubling). Users 33, 34 and 36, 37 via the external user device send data via e-mail service 18, or completing a form at the website 23 or via mobile application 24. Applications are assigned identification numbers in the system and analyzed and recognized. After being confirmed the data of applications 48 and 49 is saved in the general data base of applications (applications of cargo owners and vessel owners' proposals), and the recognized data is inserted in tables with the peculiarities of cargos/vessels and terms and conditions of traffic/display onto the display of the external user device 2 by means of the data recognition module 8 and the automated module of generating a solution, providing visualization of demand for tonnage and tonnage offer, taking into account the entire complex of applications of users 33, 34, 36, 37.

Thereafter, formation of data with parsing rules in the system is carried out with the participation of 25-28 records and includes a row of sequential procedures.

The applications data 48 and 49 is processed by the central server 1 using the module 8 (FIG. 2) using existing parsing rules from the relevant data base. Unprocessed table fields are kept in the unprocessed information data base. Final tables with empty fields to insert data manually, initially available for the personal account 28 through the module of parsing rules data base creation. After being created, final table data (during the fixed time) is sent from the central server 1 onto the external user device 2 through the personal account 25 or 26 with reference to the final table with the rest empty fields for data input.

User by means of the personal account 25 or 26 interacts with the system and obtains data from the system via the user interface, the mobile application 24 can have or by means of web-interface of the website 23.

In the left part of the user interface there is data of the parent application, in the right part there is a table, where is a cursor in the empty mandatory field. Having filled the current field of the table, the cursor automatically goes to the next empty mandatory field to fill the final table completely. If necessary, changes can be made in case of incorrect values, shifting between the fields is carried out by means of up and down arrows or immediately by cursor.

Having filled the table completely, its data is available for the user's personal account 28, by means of which it creates new reference to the table and sends it to the external user device 2 by means of the personal account 25 or 26 to obtain data on the table handling completion.

The table data confirmation result is as follows:

application data processed by the module 8 is included in the general data base of the confirmed applications of cargo owners and vessel owners' proposals, which is a part of the complex of databases 14;

application data, containing complete information on introduction of data unprocessed by parsing rules from the personal accounts 25 and 26, is available for the personal account 28.

Having completed the table, data on new rules related to the incoming application processing is being formed by means of the personal account 28.

In the private office, available via the personal accounts 25 and 26, users can change advanced parameters, associated with the data of the previously sent application. In case of change of the primary parameters of application the data of the previous application is cancelled in the system and data of the changed application with new identification number is created.

The correspondence of application data and vessel data in order to avoid falsification of its technical characteristics and to exclude in the further processes of application as to the incompliance with the severe requirements of filter (for example, when indicating its) is controlled by means of administrating the open freight market simulation system.

If after passing the parsing process it is defined, that applications contain data of one and the same vessel (for example, coincidence of unique identifier of vessel (IMO) and name of vessel), but with different operating characteristics/particulars, so the data of such an application will be sent to the administrator to define identity of vessels and their unification in case of identity, having bound with the relevant applications. Only after administering, the application data is sent for processing into the automated module of the generating a solution.

Then, via the created personal account in the system users 35, 38, 39 (FIG. 3) obtain access to the functions of the data processing module 6 of the system as active external users (not forming demand for tonnage and tonnage offering in the system).

2. Searching data by users 33-39 of various kind of behavior in the system without using/using the automated module of generating a solution by means of application server 9.

For this purpose, the automated module of the generating a solution supposes narrowing (filtration) 50 of the variety of applications according to the criteria specified by users, obtaining for users at the output data 51 and 52 of variants of the selected applications for the relevant kind of users.

Having submitted an application, users 33 (FIG. 3) wait for proposals without using the automated module of generating a solution from users 37, 38, and 39 and users 36 wait therefor from users 34, 35 and 39.

After the system registered application data users 34 and 37 (FIG. 3) act in the following manner:

users 34 wait for proposals from users 37, 38, and 39 and simultaneously carry out search 53 of the corresponding proposals of users 36, 37 by means of the automated module of generating a solution;

users 37 wait for proposals from users 34, 35, and 39 and simultaneously carry out search 54 of the corresponding proposals of users 33, 34 by means of the automated module of generating a solution;

Users 35, 38, and 39 (FIG. 3), who do not set data of applications in the system, act in the following manner:

users 35 carry out search 53 of the corresponding proposals of users 36, 37 by means of the automated module of generating a solution;

users 38 carry out search 54 of the corresponding proposals of users 33, 34 by means of the automated module of generating a solution;

users 39 carry out search 53 and 54 of the fitting together proposals of users 33, 34 and 36, 37 by means of the automated module of generating a solution.

The algorithms of the module operation of automation of generating a solution, described above (heuristic algorithms and economic and mathematical models) are used by means of interface of the application server 9 (FIG. 2), ensuring the principle interaction of the system users (applications processing), where the automated module of the generating a solution represents a solution-making device, allowing to solve problems related to version choice 42, meeting the specified criteria. For this purpose, the module provides for creation of solution data 55 and data sending 56 and 57 onto the corresponding user device via their personal accounts.

To ensure the operation of the automated module of generating a solution, one uses application data, as well as data from the complex of databases 14, which are updated and completed by means of the module 7 (FIG. 2). The complex of data bases 14 contains information about all aspects, significant for true representation of freight market functioning. Set of such data and structural relations can be changed during the system operation process. To obtain reliable data on the transport infrastructure subjects a personal account 27 is created in the system (FIG. 2) to register such kind of users and their access to the system as information resource of user. By means of the created personal account, user as a transport infrastructure subject inserts into the system data, related to the transport infrastructure object.

Via the applied program interface (API) the system can be connected with any external data bases, for example, marine agent data bases etc.

3. The negotiations process on terms and conditions terms and creation of contract on this basis is carried out in the following manner.

After certain participants of open freight market have defined data, matching the parameters set by them, the contract/fixture terms data (terms and conditions) exchange is carried out between the users in the system. During the data exchange the relevant terms of contract/fixture (satisfying both parties) and corresponding freight rate are determined. The data exchange can be implemented by means of message exchange within system and/or via email.

At the same time, in the module 10 proposals with equal parameters are compared, sorted according to their best fit, for example, according to cost criterion. The negotiations process of negotiating/ also includes:

viewing terms of contract/fixture, required by users 33-39 and their acceptance or offering (bid/counteroffer) own conditions online;

selecting or deselecting terms and conditions from the list, as well as adding own conditions, changes of bid, dates etc.;

viewing all submitted cargo bids (without an opportunity to view user data, made a bid. The system offers an opportunity to obtain data on user, made a bid, only for a certain personal account, by means of which the application for this freight transportation was filed;

data of freight/hire rate submission in the system on the vessel (daily hire rate);

data entry in the system by means of a short text form (region or port of vessel delivery, region or port of vessel redelivery, preferred dates, planned type of cargo, charter duration);

display of freight/hire rate data for the vessel (daily hire rates), which are given for one or another vessel, without mentioning company's name;

comparison of positions, provided to a certain vessel in advance, with its real position 3-2-1 days before release;

creation of letter-request for vessel owner or letter-freight quotation for cargo owner for transportation of a certain cargo in semi-automated mode by "pulling" the cargo image onto the vessel, and vice versa, correspondingly, in the user interface;

By means of the "pulling" function it is possible to commit contract/fixture between two participants of the system, as a result of which they will be sent automatically written confirmation in the form of email containing the agreed terms and conditions with the terms of contract/fixture. In the system it is possible to carry out the automated confirmation or refusal depending on the setting of the system in case, if the contract/fixture is clenched via the interface between two users of the system, namely, participants of open freight market, or an information sharing e-mail is sent to these users, or in case, if the function of automatic generation is on, in N hours (it is defined by the system settings) an application will be created automatically or by switching to the user interface and confirmation immediately from the interface itself. If the function of application automatic generation is off, then in N hours the application will be cancelled.

Creation and sending of documents related to the contract/fixture confirmation in the system is carried out in the following manner.

After the contract/fixture was confirmed via personal accounts of users, the applications are displayed in the system as confirmed. The contract/fixture participants are sent a Recap or Charter Party or Bimco Standard Charter Party. This contract consists of principal block and addenda. The principal block shall be previously downloaded by user onto the central server 1 in the system settings. Addenda is created from the program database and contains all terms of contract/fixture. At the system output it is possible to transform the created recap contract into the standard forms of contracts (the module 12 keeps all terms of contract as a PDF file), accepted by the international organizations (BIMCO, FONASBA etc.). Also, it is possible to obtain the contract on the tangible medium (for example, as a hard copy).

By means of the module 12 also contract/fixture data is saved as a PDF file on the server and in the data base locally, as well as emails are sent to the owners of applications with data on the change of contract/fixture/vessel status with technical opportunity to view vessel location by means of the module 11 by reference.

Moreover, by means of the module 11 of the the data processing module 6 it is possible to monitor contract/fixture completion via the user personal account, including visualization of vessel traffic with cargo or without cargo, as well as to monitor vessel status, for example, in the form of active chart, available for user in private office.

The invention claimed is:

1. An open freight market simulation system, comprising a hardware-software system including a hardware module and a data processing module, the hardware module comprising:

at least one central server; and a complex of external devices of users, connected with the central server by data interchange means, the complex of external devices of users communicating with the at least one central server cryptographically via hypertext transfer protocol secure (HTTPS) protocol with transport layer security (TLS) using asymmetric encryption or symmetric encryption, data of the users being encrypted using the asymmetric encryption or symmetric encryption, thereby improving data protection of the hardware-software system, wherein the asymmetric encryption comprises generation of an asymmetric encryption general private key that is authenticated when data is received, and wherein the symmetric encryption comprises generation of a symmetric encryption private key;

wherein the central server is connected with external e-mail servers by e-mail sending/receiving media;

wherein the hardware module is connected with the central server and comprises at least one database that contains data on peculiarities and/or conditions of vessels' proposals as to the freight transportation, associated with a created personal account of participants of open freight market;

wherein the hardware module further comprises at least one database that contains data on peculiarities and/or conditions of application for freight transportation, associated with a created personal account of participants of open freight market; and wherein the hardware module further comprises at least one database that contains data on peculiarities and/or conditions of a transportation facility functioning, associated with a created personal account of transport infrastructure subjects; and wherein the data processing module is adapted to generate a complex of the personal accounts of participants of open freight market and a complex of the personal accounts of transport infrastructure subjects, ensuring a functioning of an open freight market, via website and/or via software client, installed on the external device of a user;

wherein the data processing module is adapted to receive and store data of a complex of the applications for freight transportation and a complex of the applications on the proposals of vessels in form of electronic circular letters using e-mail service and/or using manual input and/or using data carrier through the personal account of participant of open freight market;

wherein the data processing module comprises a module of generation of at least one first internal database, containing data on the complex of the applications for freight transportation;

wherein the data processing module further comprises a module of generation of at least one second internal database, containing data on the complex of the applications on the proposals of vessels;

wherein the data processing module is adapted to transform the received electronic circular letters into an electronic sea shipping contract, containing data on cargo for transportation and data on vessel for transportation, as well as conditions for carriage of freight and port of departure and port of destination date using information, received from the personal accounts of participants of open freight market and complex of personal accounts of transport infrastructure subjects;

wherein the central server is connected with at least one database that contains data of the generated electronic sea shipping contracts, associated with the received applications and/or the personal accounts of users;

wherein the data processing module comprises a data recognition module, which recognizes tonnage offering, including data as follows: name and identification codes of vessels, vessel operating characteristics, position of vessels, date of opening of a vessel, requirements to cargos and essential conditions of transaction, and data on demands for tonnage, including the following data: description of cargos, qualitative and quantitative characteristics of cargos, dimensioning specifications, lay can, conditions of transport, significant conditions of transaction, submitting in electronic form prepared in any form via e-mail service and/or via physical media and/or via manual input by means of website and/or via software client;

wherein the data recognition module has a structure of a learning algorithm comprising a plurality of add-in modules comprising N modules, where N is an integer, the N modules comprising a first module through an Nth module, in sequential chain according to a scheme as follows: source data is received by the first module and generates first processed data, then a second module of the N modules receives the first processed data from the first module and the source data and generates second processed data, then a third module of the N modules receives the second processed data from the second module and the source data and generates third processed data, and this continues until the Nth module receives (N-1)th processed data from an (N-1)th module of the N modules and the source data and generates Nth processed data, such that each module of the plurality of add-in modules processes the processed data from a previous module of the sequential chain and also the source data, wherein the source data is received from databases formed as a result of processing of the received electronic circular letters; and wherein the data recognition module comprises a set of parsing rules and the learning algorithm is trained by applying the parsing rules to the received electronic circular letters, wherein the data recognition module updates the parsing rules each time data of a previously unknown kind is received by the data recognition module so that such data of a previously unknown kind is more efficiently parsed the next time it is received, thereby improving a speed of the hardware-software system.

2. The system according to claim 1, wherein the central server is located in cloud storage.

3. The system according to claim 1, wherein the central server is connected with GEO-systems external servers and with GEO-devices of vessels via means of obtaining the vessel's geographical coordinates and cargo transported thereon.

4. The system according to claim 1, wherein the central server is connected with external servers of payment systems for purpose of financial transactions performance.

5. The system according to claim 1, wherein the central server is connected with the external devices of users in order to obtain installation data of software client onto the external device of a user.

6. The system according to claim 1, wherein the data processing module comprises a module of forming and visualizing data on demand for tonnage and tonnage offering and changes of the data on demand for tonnage and tonnage offering.

7. The system according to claim 1, wherein the data processing module comprises a module of data exchange between participants of open freight market by means of the personal accounts of participants of open freight market and of data exchange with transport infrastructure subjects.

8. The system according to claim 1, wherein the data processing module comprises an automated module connected with at least one database that contains data of the application for freight transportation; and with at least with one database containing data of the peculiarities and/or conditions of vessels' proposals as to the freight transportation, associated with the personal account of transport infrastructure subjects of open freight market.

9. The system according to claim 1, wherein the data processing module comprises a module of data exchange for agreement of terms and conditions, including establishment of equitable freight rate for participants of open freight market with regard to at least one pair of the applications or complex of the relevant applications.

10. The system according to claim 3, wherein the data processing module comprises a module for monitoring contract performance, including visualization of vessel traffic with cargo or without cargo by means of data of the external servers of GEO-systems and data of the GEO-devices of vessels.

11. The system according to claim 10, wherein the module for monitoring contract performance is implemented as an active chart, stimulating vessel traffic and transactions with at least one of cargo and a vessel.

12. The system according to claim 1, wherein the data processing module comprises a data search module in the at least one first internal database and the at least one second internal database according to criteria, which are set using the personal account of participant of open freight market and/or using the personal account of transport infrastructure subject.

13. The system according to claim 1, wherein the data processing module comprises located on the server a module of simulation of an equitable freight rate establishment process with regard to pair of the applications or complex of the relevant applications in open freight market under the initially set and changed conditions with further generation of the electronic sea shipping contract.

14. The system according to claim 2, further comprising an application server, located in the cloud storage and interacting via API system with the software client, located in cloud storage and on the external device of a user.

15. The system according to claim 14, wherein the data processing module comprises an automated module connected with at least one database that contains data of the application for freight transportation; and with at least with one database containing data of the peculiarities and/or conditions of vessels' proposals as to the freight transportation, associated with the personal account of transport infrastructure subjects of open freight market, and wherein the application server is adapted to provide in virtual space one of visualization of demand for tonnage and tonnage offering in real-time mode on information output data displaying characteristics and conditions of vessels' proposals and applications for freight transportation and/or visualization of supply and demand change in the open freight market in real-time mode and/or visualization of function of the automated module and/or visualization of interaction between components of the system for displaying vessel/cargo matches and vice versa on the external device of user.

16. The system according to claim 1, wherein the data processing module comprises a data transfer module, which transfers data related to the sea shipping contract as a PDF file onto the central server and for storage in the database with an opportunity to send e-mails onto the external devices of users, containing data on the changed transaction/vessel status.

17. The system according to claim 1, wherein the data processing module comprises a single program block with various levels of access.

18. The system according to claim 1, wherein the data processing module comprises a module of forming databases of parsing rules with individual access level.

19. The system according to claim 1, wherein the data processing module has an architecture in a form of scalable modules, united in a single point of the system entry for all external devices of users.

20. The system according to claim 1, wherein as the external user device one used cell phone or smartphone, or desktop computer, or laptop, or netbook, or tablet computer, equipped with the central server data exchange means, data processing means and means for displaying data on screen of the external user device.

21. An open freight market display method, comprising:
organization of a complex of personal accounts of participants of open freight market and complex of personal accounts of transport infrastructure subjects on a central server of at least one data processing module of a hardware-software system via website and/or software client, associated with the mentioned central server;
receiving by the central server of data of a complex of applications for freight transportation and a complex of applications on proposals of vessels in a form of electronic circular letters using e-mail service and/or using manual input and/or using physical media through a personal account of a participant, of the complex of personal accounts of participants of open freight market, in the form of electronic circular letters;
generation of a database connected with the central server, which contains data on peculiarities and/or conditions of vessels' proposals as to the freight transportation, associated with the created personal account of participants of open freight market;
generation of a database connected with the central server, which contains data on peculiarities and/or conditions of the freight transportation by vessels, associated with the created personal account of participants of open freight market;
generation of a number of relevant applications and data on the peculiarities and/or conditions of the vessels' proposals as to transportation of cargo for further agreement of contract data by means of message exchange between the personal accounts of participants of open freight market;
transformation of a number of the relevant applications into an electronic sea shipping contract, containing data on cargo for transportation and data on vessel for transportation, as well as conditions for carriage of freight and port of departure and port of destination date using information, received from the personal accounts of participants of open freight market and complex of personal accounts of transport infrastructure subjects, using the data processing module;
storage of the application data for freight transportation and data of the created electronic sea shipping contract in a database, connected with the central server; and
sending the electronic sea shipping contract onto an external device of user using the personal account of the participant, wherein the electronic sea shipping contract is sent cryptographically via hypertext transfer protocol secure (HTTPS) protocol with transport layer security (TLS) using asymmetric encryption or symmetric encryption, thereby improving data protection of the external device, wherein the asymmetric encryption comprises generation of an asymmetric encryption general private key that is authenticated when data is received, and wherein the symmetric encryption comprises generation of a symmetric encryption private key;
wherein the data processing module comprises a data recognition module, which recognizes tonnage offering, including data as follows: name and identification codes of vessels, vessel operating characteristics, position of vessels, date of opening of a vessel, requirements to cargos and essential conditions of transaction, and data on demands for tonnage, including the following data: description of cargos, qualitative and quantitative characteristics of cargos, dimensioning specifications, lay can, conditions of transport, significant conditions of transaction, submitting in electronic form prepared in any form via e-mail service and/or via physical media and/or via manual input by means of website and/or via software client; and
wherein the data recognition module has a structure of a learning algorithm comprising a plurality of add-in modules comprising N modules, where N is an integer, the N modules comprising a first module through an Nth module, in sequential chain according to a scheme as follows: source data is received by the first module and generates first processed data, then a second module of the N modules receives the first processed data from the first module and the source data and generates second processed data, then a third module of the N modules receives the second processed data from the second module and the source data and generates third processed data, and this continues until the Nth module receives (N-1)th processed data from an (N-1)th module of the N modules and the source data and generates Nth processed data, such that each module of the plurality of add-in modules processes the processed data from a previous module of the sequential chain and also the source data, wherein the source data is received from databases formed as a result of processing of the received electronic circular letters;
wherein the data recognition module comprises a set of parsing rules; and
wherein the method further comprises training the learning algorithm of the data recognition module by applying the parsing rules to the received electronic circular letters, wherein the data recognition module updates the parsing rules each time data of a previously unknown kind is received by the data recognition module so that such data of a previously unknown kind is more efficiently parsed the next time it is received, thereby improving a speed of the hardware-software system.

22. The method according to claim 21, comprising providing the electronic sea shipping contract in paper hard copy, executed in accordance with standards of documenting carriage of freights by sea.

23. The method according to claim 21, comprising transferring current data on parameters of demand for tonnage and tonnage offerings to the database of applications for a purpose of creation of single information complex with data in ever-growing and updating global data bases of the system in format, allowing to transform them in an automated module automated of solution generating to determine a variety of the relevant applications by displaying space of input data on a decision space.

24. The method according to claim 21, wherein the data processing module comprises an automated module connected with at least one database that contains data of the application for freight transportation; and with at least with one database containing data of the peculiarities and/or conditions of vessels' proposals as to the freight transportation, associated with the personal account of transport infrastructure subjects of open freight market, and
 wherein the method further comprises allowing insertion of data of a financial result of vessel operation using the personal account of participant of open freight market for further automatic generation of a number of the relevant applications with parameters best fit to a specified result in the automated module.

* * * * *